Patented Dec. 23, 1947

2,433,306

UNITED STATES PATENT OFFICE 2,433,306

DEHYDRATION OF NITRILES BY AZEOTROPIC DISTILLATION WITH CHLOROFORM

John W. Teter and Walter J. Merwin, Chicago, Ill., assignors to Sinclair Refining Company, New York, N. Y., a corporation of Maine No Drawing. Application October 6, 1943, Serial No. 505,198

2 Claims. (Cl. 202—42)

This invention relates to the purification of nitriles and more particularly to an improved method of dehydrating nitriles of two to four carbon atoms per molecule, i. e., acetonitrile, acrylonitrile, propionitrile, normal butyronitrile, and iso-butyronitrile whereby anhydrous or substantially dehydrated nitriles may be obtained by direct fractional distillation of the respective nitriles contaminated by water.

Each of the above mentioned nitriles has been found to form a binary azeotrope with water and accordingly dehydration of these nitriles has presented a difficult problem.

We have discovered that if chloroform be added to a water-contaminated nitrile of the above mentioned class, the chloroform will form an azeotrope with the water present but does not form, to any substantial extent, at least, either a binary azeotrope with the nitrile or a ternary azeotrope with the nitrile and water.

The boiling point of pure chloroform is 61.2° C., while the chloroform water azeotrope has been found to distill off within the temperature range of about 55–60° C. The lowest boiling of these nitriles, acrylonitrile, has a boiling point of approximately 78° C. The boiling point of propionitrile is approximately 97° C., that of iso-butyronitrile, approximately 103° C., and that of normal butyronitrile approximately 118° C.

Utilizing this peculiarity of chloroform in the presence of the respective nitriles and water, the process of our present invention comprises the addition of chloroform to the water-contaminated nitrile and subjecting the mixture to close fractional distillation, whereby the water is carried off by the chloroform leaving behind the substantially anhydrous nitrile.

The invention is also applicable to an operation whereby the entire charge is fractionally distilled and contemplates either batch or continuous operation. The operation may include the distillation of the nitrile, or only the distillation of the water-chloroform mixture therefrom.

The optimum proportion of chloroform to be added will depend primarily upon the amount of water to be removed. Generally it has been found that the chloroform-water azeotrope contains about 2.3% water, and satisfactory results have been obtained by the use of this figure in determining the proportion of chloroform to be added in a particular operation. For complete dehydration the amount of chloroform added should be somewhat in excess of that theoretically required.

Our invention will be further described and illustrated by the following specific examples of its application.

Example I

To 25 cc. of acrylonitrile saturated with water and having a refractive index at 20° C. of 1.3899, as compared with a refractive index of 1.3911 for pure acrylonitrile, there was added 22 cc. of chloroform having a refractive index at 20° C. of 1.4449 and the mixture was subjected to close fractional distillation in a 9.5 millimeter Stedman column. The distillation temperature gradually rose from 55° C. at the beginning of the distillation to 60° C. at the point where 37.5% of the charge, by volume, had been distilled off and from thence rose sharply to 75° C. at 51% off and remained constant at 75–76° C. until 76% of the charge had been distilled off, at which point the distillation was discontinued.

A water analysis of the chloroform fraction distilled off at 55–56° C. showing it to contain 0.09% water throughout most of the range. The refractive index of the distillate at 20° C. rose gradually as the distillation continued from 1.4400 to 1.4449, the latter being that of the chloroform added, and then dropped to 1.3911 as the temperature rose to 76° C., the refractive index at 20° C. of pure acrylonitrile. The distillate passing over at this temperature was found to be completely dehydrated.

Example II

To 25 cc. of propionitrile saturated with water, the water content being 4.77%, there was added 25 cc. of chloroform having a refractive index at 20° C. of 1.4449. In this distillation the temperature gradually rose from 56° C. to about 60° C. at a point where about 33% by volume of the charge had been distilled off. In this temperature range the refractive index, at 20° C., of the distillate being distilled off rose from 1.438 to 1.446, the latter being approximately that of the added chloroform, indicating that the water originally present in the mixture had been substantially exhausted. Thereafter the refractive index of the distillate dropped sharply to 1.365 and rose to 1.3665, approximately that of pure propionitrile, as the temperature rose sharply to 95–97° C. As in the preceding Example I, the water content of the chloroform fraction was found to be 0.09%. The water content of the propionitrile fraction boiling at about 96° C. was found by analysis to be 0.46% as compared with 4.71% in the original propionitrile.

Acetonitrile and the butyronitriles contaminated by water may with advantage be dehydrated by the same general procedure without material loss of the nitrile or contamination of the nitrile product by the chloroform.

We claim:

1. A process for the dehydration of nitriles of 2 to 4 carbon atoms per molecule which comprises subjecting the hydrous nitrile to fractional distillation in the presence of chloroform.

2. A process for the dehydration of nitriles of 2 to 4 carbon atoms per molecule which comprises adding chloroform to the hydrous nitrile and distilling off the water and chloroform as an azeotrope.

JOHN W. TETER.
WALTER J. MERWIN.

REFERENCES CITED

The following references are of record in the file of this patent:

UNITED STATES PATENTS

| Number | Name | Date |
|---|---|---|
| 2,305,106 | Pratt | Dec. 15, 1942 |
| 2,263,436 | Britton et al. | Nov. 18, 1941 |
| 1,761,779 | Crowall | June 3, 1930 |
| 1,676,735 | Keyes | July 10, 1928 |
| 1,267,611 | Wells | May 28, 1918 |
| 2,002,085 | Dreyfus | May 21, 1918 |
| 1,815,802 | Schleicher | July 21, 1931 |

OTHER REFERENCES

Lecat, "Demixtion D'Azeotropes," Jour. de Chemic Physique, vol. 27, pages 75, 76, and 77. (Copy in Scientific Library.)